US008222833B2

(12) United States Patent
Lin

(10) Patent No.: US 8,222,833 B2
(45) Date of Patent: Jul. 17, 2012

(54) ILLUMINATION DEVICE FOR PLANTS

(75) Inventor: Yu-Chen Lin, Kaohsiung County (TW)

(73) Assignee: Great Top Technology Co., Ltd., Yanchao Township (TW)

( * ) Notice: Subject to any disclaimer, the term of this patent is extended or adjusted under 35 U.S.C. 154(b) by 352 days.

(21) Appl. No.: 12/729,393

(22) Filed: Mar. 23, 2010

(65) Prior Publication Data

US 2011/0234120 A1    Sep. 29, 2011

(30) Foreign Application Priority Data

Aug. 25, 2009   (TW) ................................ 98128527 A

(51) Int. Cl.
*G05F 1/00* (2006.01)
(52) U.S. Cl. ........ 315/294; 315/308; 315/312; 315/318; 315/DIG. 4; 362/231; 362/236; 362/227; 345/77; 345/102
(58) Field of Classification Search .................. 315/291, 315/294, 308, 312, 318, 169.1, DIG. 4; 362/231, 362/234, 236, 227, 240; 345/46, 47, 82, 345/83, 77, 102; 349/68–70
See application file for complete search history.

(56) References Cited

U.S. PATENT DOCUMENTS

| 7,220,018 | B2 * | 5/2007 | Crabb et al. ................. 362/234 |
| 7,695,180 | B2 * | 4/2010 | Schardt et al. ............... 362/625 |
| 8,125,152 | B2 * | 2/2012 | Fujiwara et al. ............. 313/637 |
| 2009/0109163 | A1 * | 4/2009 | Yen ................................. 345/102 |

* cited by examiner

*Primary Examiner* — Haiss Philogene
(74) *Attorney, Agent, or Firm* — Frommer Lawrence & Haug LLP; Ronald R Santucci

(57) ABSTRACT

An illumination device for plants includes a lighting unit mounted on a lamp seat and including a cold cathode fluorescent lamp and a light emitting diode (LED) unit. A driving unit is mounted to the lamp seat, is coupled to the cold cathode fluorescent lamp and the LED unit, and is operable so as to drive the cold cathode fluorescent lamp and the LED unit such that the cold cathode fluorescent lamp and the LED emit respectively color lights having respective wavelengths. A dimming unit is coupled to the driving unit, and is operable so as to output a dimming output to the driving unit. The driving unit drives the cold cathode fluorescent lamp and the LED unit based on the dimming output from the dimming unit so that the color light emitted by each of the cold cathode fluorescent lamp and the LED unit has a respective light intensity.

8 Claims, 5 Drawing Sheets

ILLUMINATION DEVICE FOR PLANTS

BACKGROUND OF THE INVENTION

1. Field of the Invention

The invention relates to an illumination device, more particularly to an illumination device for plants.

2. Description of the Related Art

With extreme variations of climate, many areas in the world will not be suitable for growth of plants, such as paddy rice and greens, such that people in these areas are to be short of food provisions. In view of this, "plant factories" have been developed in many countries. In the plant factories, an isolated room without dust is provided for plants to be planted, and water and nutrients are sufficiently supplied to the plants in the isolated room under suitable growth conditions, such as illumination and humidity. It is noted that illumination is one of most important growth conditions for plants. For example, illumination with different wavelengths may result in different influences for each plant. Moreover, duration of illumination may influence a growth speed of plants and a sweetness-degree of fruits.

Therefore, it is desired to design an illumination device for plants that is capable of generating illumination conforming to illumination requirements for each plant at different growth stages.

SUMMARY OF THE INVENTION

Therefore, an object of the present invention is to provide an illumination device for plants that can generate illumination mixed with different color lights, thereby promoting plant growth.

According to the present invention, an illumination device for plants comprises:

a lamp seat;

at least one lighting unit mounted on the lamp seat, and including at least one cold cathode fluorescent lamp and a light emitting diode (LED) unit;

a driving unit mounted to the lamp seat, coupled to the cold cathode fluorescent lamp and the LED unit of the lighting unit, and operable so as to drive the cold cathode fluorescent lamp and the LED of the lighting unit such that each of the cold cathode fluorescent lamp and the LED unit of the lighting unit emits color light having a respective wavelength; and a dimming unit coupled to the driving unit and operable so as to output a dimming output to the driving unit, the driving unit driving the cold cathode fluorescent lamp and the LED unit of the lighting unit based on the dimming output from the dimming unit so that the color light emitted by each of the cold cathode fluorescent lamp and the LED unit of the lighting unit has a respective light intensity.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
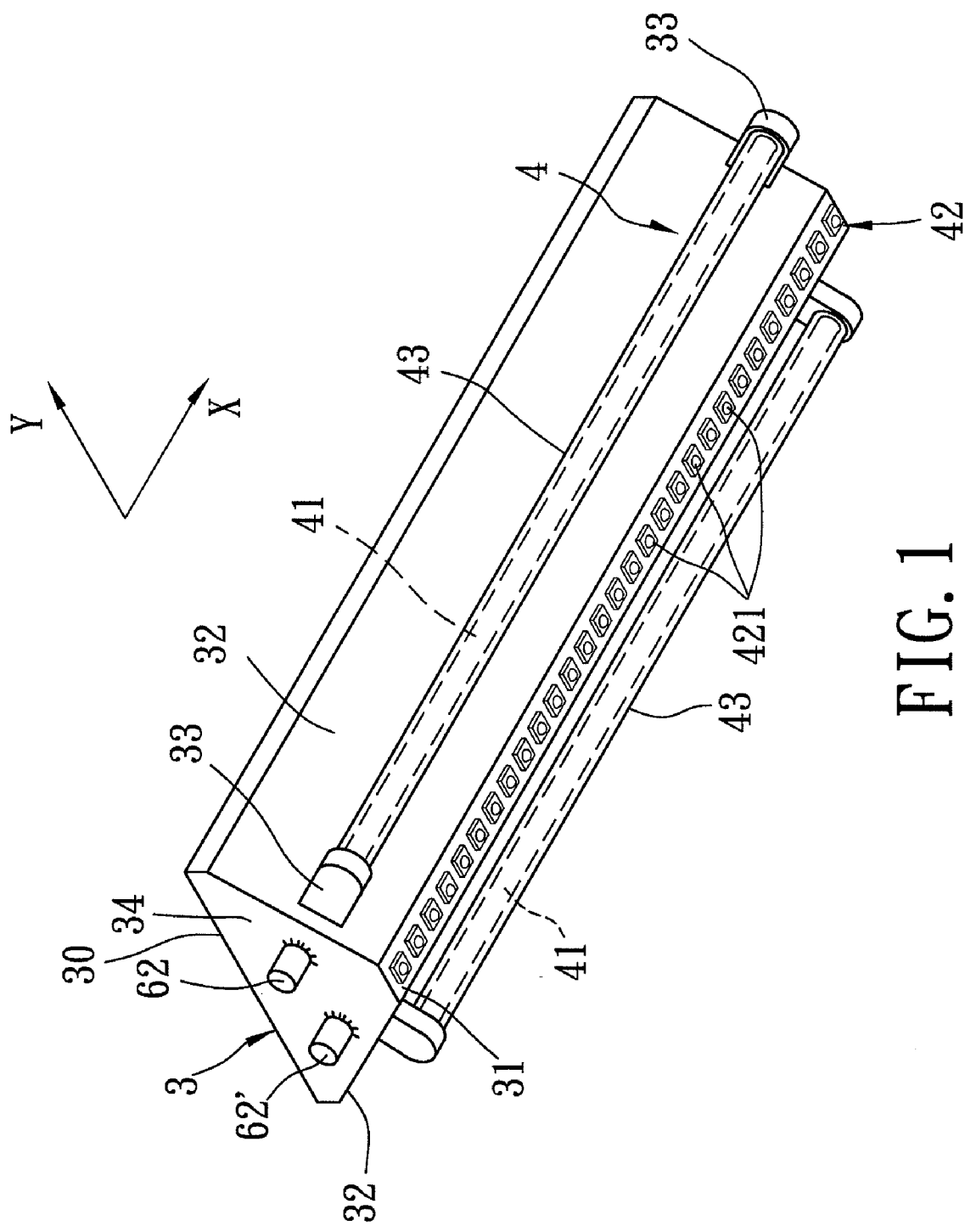
FIG. 1 is a perspective bottom view showing the first preferred embodiment of an illumination device for plants according to the present invention.

Before the present invention is described in greater detail, it should be noted that like elements are denoted by the same reference numerals throughout the disclosure.

Figure 2:
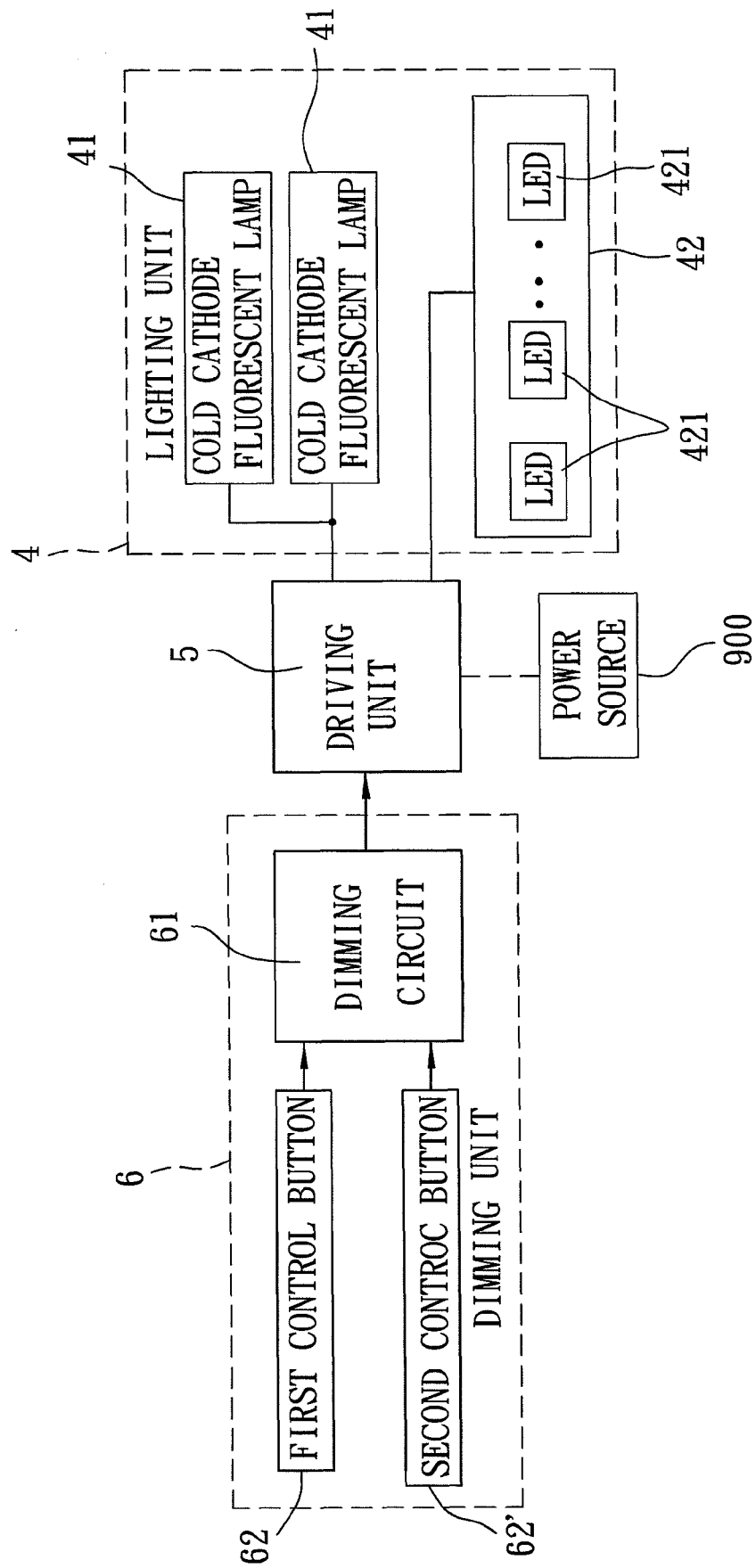
FIG. 2 is a schematic circuit block diagram illustrating the first preferred embodiment.

Referring to FIGS. 1 and 2, the first preferred embodiment of an illumination device for plants (not shown) according to the present invention is shown to include a lamp seat 3, a lighting unit 4, a driving unit 5, and a dimming unit 6.

In this embodiment, as shown in FIG. 2, the lamp seat 3 extends in a first direction (X), has opposite top and bottom surfaces 30, 31, two lateral surfaces 34 opposite to each other in the first direction (X), and two inclined side surfaces 32 opposite to each other in a second direction (Y) transverse to the first direction (X) such that a width of the lamp seat 3 in the second direction (Y) gradually decreases toward the bottom surface 31. Each side surface 32 is provided with a pair of conductive connecting sockets 33 spaced apart from each other in the first direction (X).

The lighting unit 4 is mounted on the lamp seat 3. In this embodiment, the lighting unit 4 includes two elongate transparent tube bodies 43, two cold cathode fluorescent lamps 41 and a light emitting diode (LED) unit 42. Each tube body 43 extends and is fixed between the connecting sockets 33 on a corresponding side surface 32 of the lamp seat 3. Each cold cathode fluorescent lamp 41 is received in a corresponding transparent tube body 43, and is connected electrically between the connecting sockets 33 on a corresponding side surface 32. The LED unit 4 includes a plurality of LEDs 421 disposed directly on the bottom surface 31 and arranged in the first direction (X).

The driving unit 5 is mounted to the lamp seat 3, is coupled to each cold cathode fluorescent lamp 41 via the connecting sockets 33 on the corresponding side surface 32 of the lamp seat 3 and to the LED unit 42. The driving unit 5 is adapted to be coupled to a power source 900 for receiving a voltage input therefrom. The driving unit 5 is operable so as to drive the cold cathode fluorescent lamps 41 and the LED unit 42 in a known manner so that each of the cold cathode fluorescent lamps 41 and the LED unit 42 emits color light having a respective wavelength. In this embodiment, the color light emitted by each of the cold cathode fluorescent lamps 41 and the LEDs 421 is one of red color light, blue color light and green color light. The wavelength of the color light emitted by each of the cold cathode fluorescent lamps 41 and the LEDs 421 ranges from 645 nm to 675 nm when the color light emitted by a corresponding one of the cold cathode fluorescent lamps 41 and the LEDs 421 is red color light, ranges from 515 nm to 545 nm when the color light emitted by the corresponding one of the cold cathode fluorescent lamps 41 and the LEDs 421 is green color light, and ranges from 435 nm to 465 nm when the color light emitted by the corresponding one of the cold cathode fluorescent lamps 41 and the LEDs 421 is blue color light. Therefore, the lighting unit 4 is capable of generating illumination mixed with red color light, green color light and blue color light.

The dimming unit 6 is coupled to the driving unit 5, and is operable so as to output a dimming output to the driving unit 5. The driving unit 5 drives the cold cathode fluorescent lamps 41 and the LED unit 42 based on the dimming output from the dimming unit 6 so that the color light emitted by each of the cold cathode fluorescent lamps 41 and the LED unit 42 has a respective light intensity. In this embodiment, the dimming unit 6 includes first and second control buttons 62, 62', and a dimming circuit 61. The first and second control buttons 62, 62' are mounted on one of the lateral surfaces 34 of the lamp seat 3, and are operable so as to generate respectively first and second input signals. The dimming circuit 61 is mounted to the lamp seat 3, is connected electrically to the first and second control buttons 62, 62', receives the first and second input signals generated respectively by the first and second control buttons 62, 62', and outputs to the driving unit 5 first and second dimming control signals corresponding respectively to the first and second input signals received thereby. In this embodiment, the first and second dimming control signals constitute the dimming output. In other words, the first and second dimming control signals correspond respectively to driving voltage for each cold cathode fluorescent lamp 41 and the LED unit 42. The light intensity of the color light emitted by each cold cathode fluorescent lamp 41 is modulated in response to the first dimming control signal. Therefore, by operation of the first control button 62, the light intensity of the color light emitted by each cold cathode fluorescent lamp 41 can be modulated. On the other hand, the light intensity of the color light emitted by the LED unit 42 is modulated in response to the second dimming control signal. Therefore, by operation of the second control button 62', the light intensity of the color light emitted by the LED unit 42 can be modulated.

In use, for plants used to growing in low-temperature environment, the LED unit 42 can be first driven by the driving unit 5 such that ambient environment around the illumination device is pre-heated by heat generated by the LED unit 42. Then, the cold cathode fluorescent lamps 41 are driven. Since the ambient environment is relatively warm as a result of the heat generated by the LED unit 42, the cold cathode fluorescent lamps 41 can maintain a superior lighting efficiency. As a result, the illumination device of the present invention can be used in low-temperature growth environment. On the other hand, when the color lights emitted by the cold cathode fluorescent lamps 41 and the LED unit 42 differ from each other, the illumination device of the present invention can generate illumination mixed with red color light, green color light and blue color light. Preferably, by operation of the first and second control buttons 62, 62' of the dimming unit 6, the light intensities of the color lights emitted by the cold cathode fluorescent lamps 41 and the LED unit 42 can be modulated so as to conform to illumination requirements for plants at different growth stages, thereby promoting plant growth.

Figure 3:
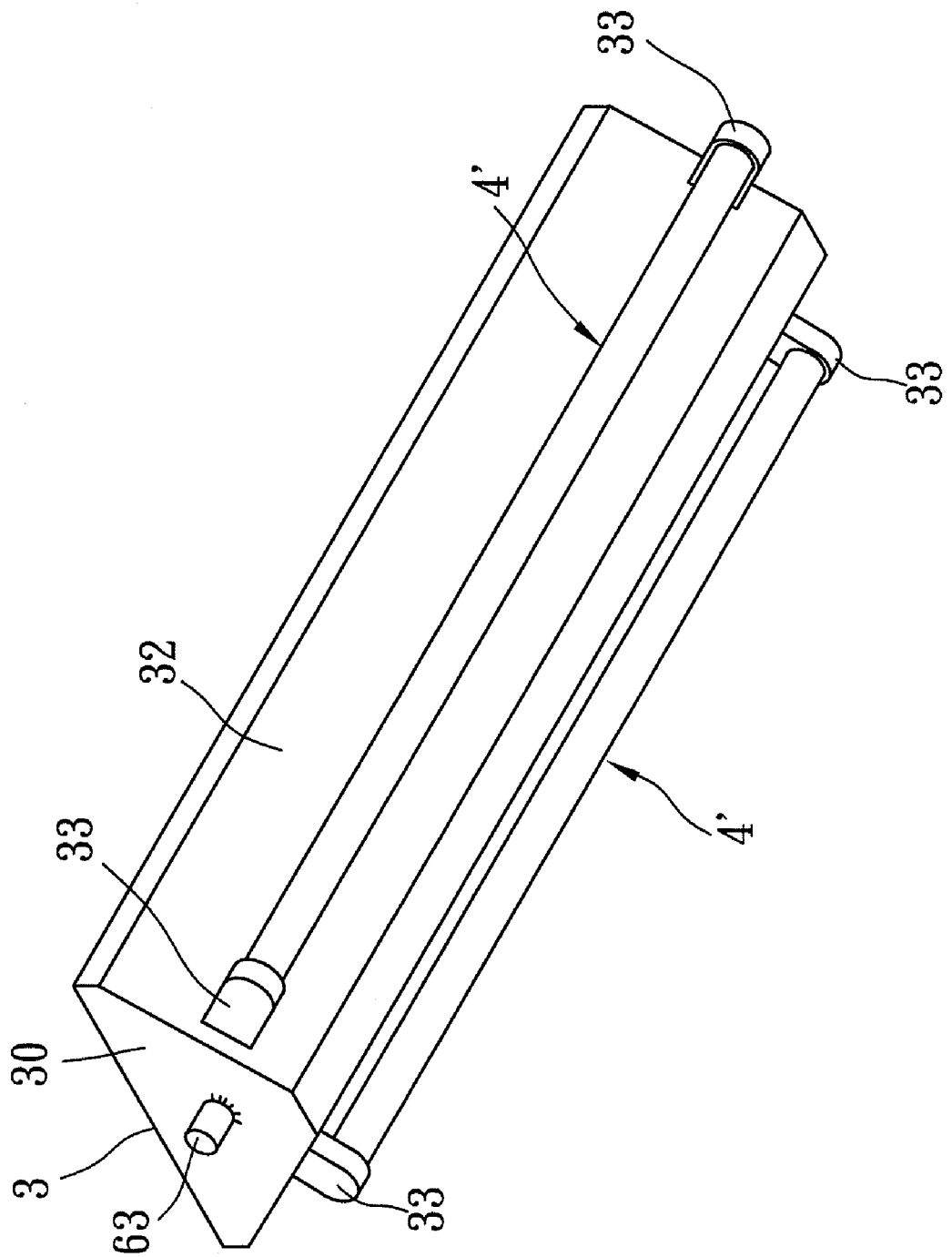
FIG. 3 is a perspective view showing the second preferred embodiment of an illumination device for plants according to the present invention.
Figure 4:
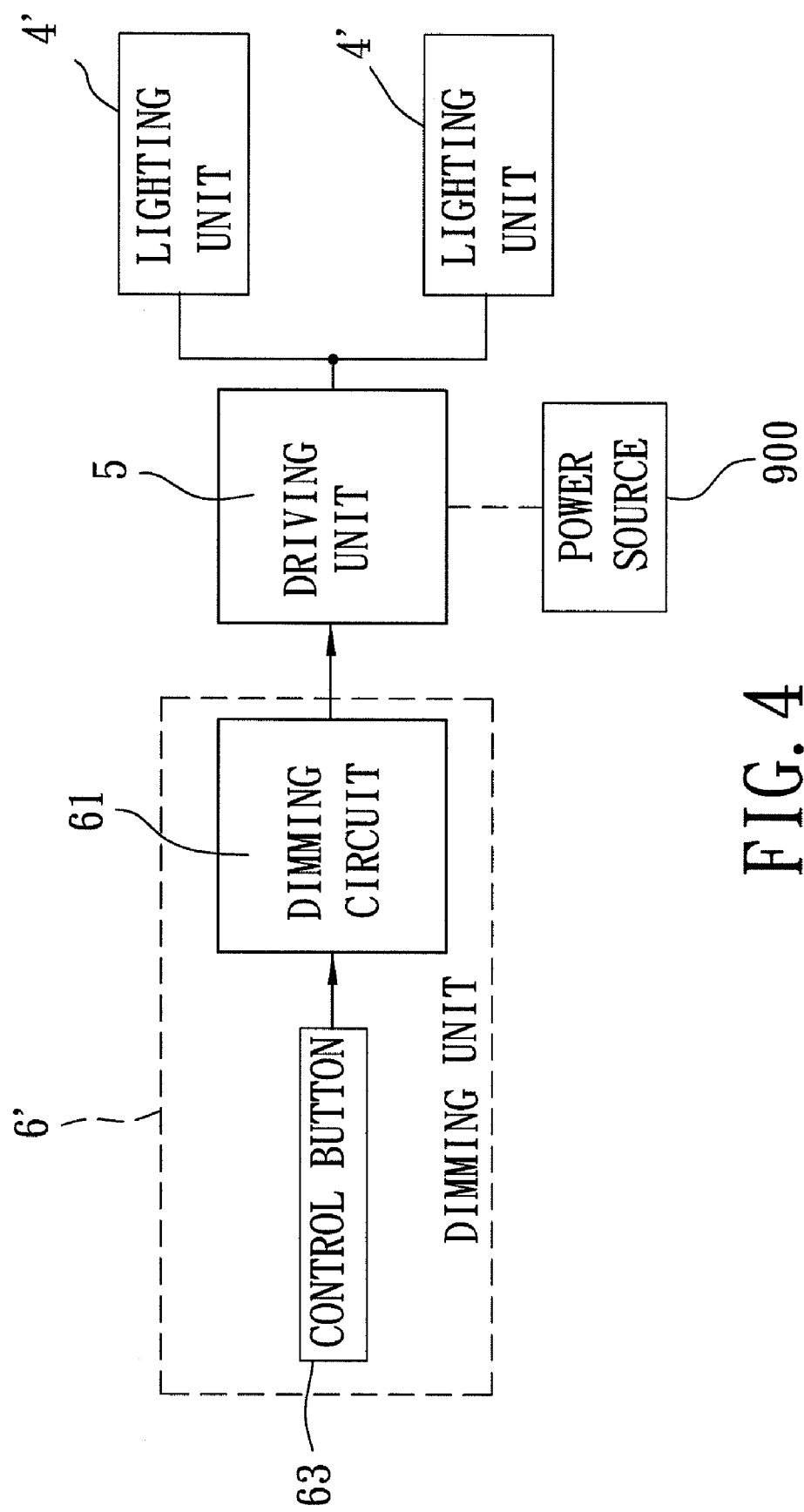
FIG. 4 is a schematic circuit block diagram illustrating the second preferred embodiment.
Figure 5:
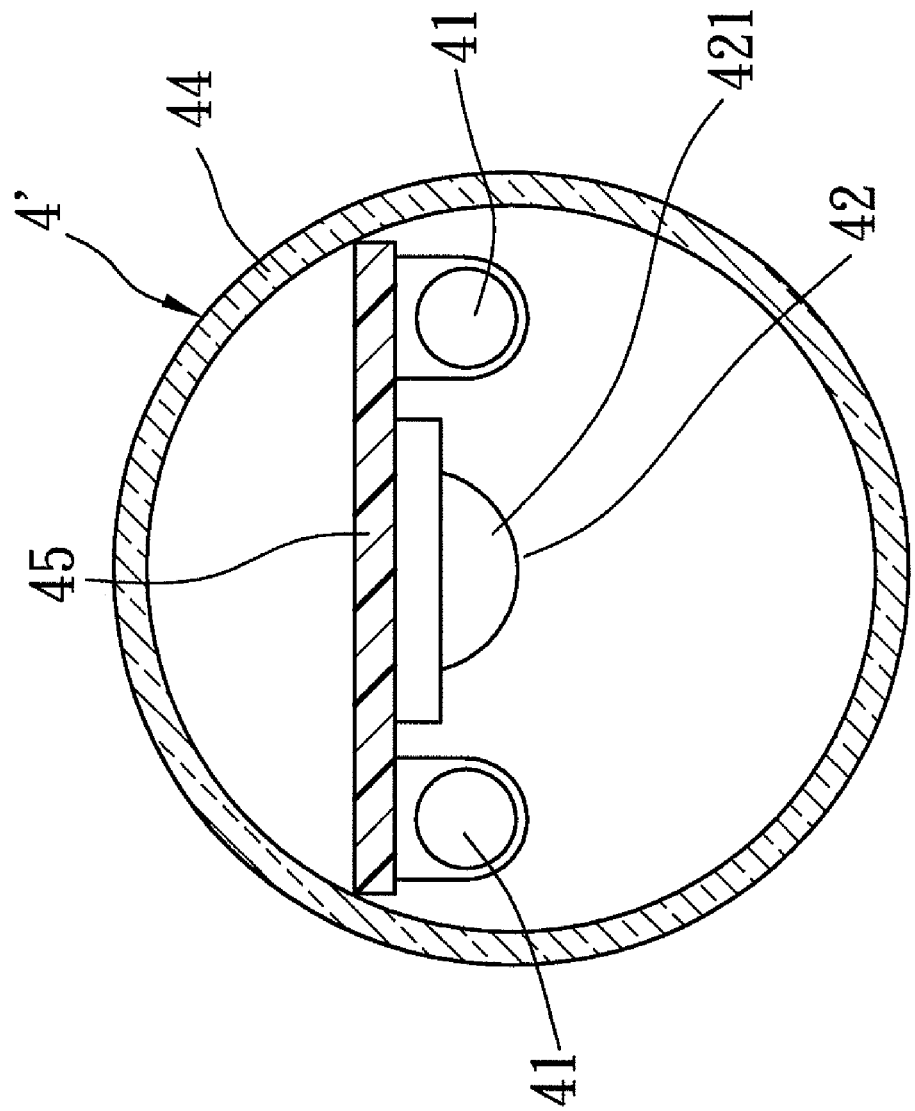
FIG. 5 is a partly schematic sectional view showing a lighting unit of the second preferred embodiment.

FIGS. 3 to 5 illustrate the second preferred embodiment of an illumination device for plants according to this invention, which is a modification of the first preferred embodiment. As compared to the first preferred embodiment, the illumination device includes two of the lighting units 4', each of which is mounted on a corresponding side surface 32 of the lamp seat 3.

In this embodiment, as shown in FIG. 5, each lighting unit 4' further includes a transparent tube body 45 disposed and fixed between the connecting sockets 33 on the corresponding side surface 32 of the lamp seat 3 for receiving the cold cathode fluorescent lamps 41 and the LED unit 42 disposed on a circuit board 45 therein.

Furthermore, the dimming unit 6' includes a single control button 63 mounted on one of the lateral surfaces 34 of the lamp seat 3 and operable so as to generate an input signal, and the dimming circuit 61 mounted to the lamp seat 3 and connected electrically to the control button 63. In this embodiment, the dimming circuit 61 receives the input signal generated by the control button 63, and outputs to the driving unit 5 a dimming control signal corresponding to the input signal received thereby. It is noted that the dimming control signal serves as the dimming output. The light intensity of the color light emitted by each of the cold cathode fluorescent lamps 41 and the LED unit 42 is modulated in response to the dimming control signal. Therefore, by operation of the control button 63, the light intensity of the color light emitted by each of the cold cathode fluorescent lamps 41 and the LED unit 42 can be modulated.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An illumination device for plants, comprising:
a lamp seat;
at least one lighting unit mounted on said lamp seat and including at least one cold cathode fluorescent lamp and a light emitting diode (LED) unit;
a driving unit mounted to said lamp seat, coupled to said cold cathode fluorescent lamp and said LED unit of said lighting unit, and operable so as to drive said cold cathode fluorescent lamp and said LED unit of said lighting unit such that each of said cold cathode fluorescent lamp and said LED unit of said lighting unit emits color light having a respective wavelength; and
a dimming unit coupled to said driving unit and operable so as to output a dimming output to said driving unit, said driving unit driving said cold cathode fluorescent lamp and said LED unit of said lighting unit based on the dimming output from said dimming unit so that the color light emitted by each of said cold cathode fluorescent lamp and said LED unit of said lighting unit has a respective light intensity.

2. The illumination device as claimed in claim 1, wherein:
said lighting unit further includes at least one transparent tube body mounted on said lamp seat for receiving said cold cathode fluorescent lamp therein; and
said LED unit of said lighting unit is disposed directly on said lamp seat.

3. The illumination device as claimed in claim 1, wherein the color light emitted by each of said cold cathode fluorescent lamp and said LED unit of said lighting unit is one of red color light, blue color light and green color light.

4. The illumination device as claimed in claim 3, wherein the wavelength of the color light emitted by each of said cold cathode fluorescent lamp and said LED unit of said lighting unit ranges from 645 nm to 675 nm when the color light emitted by a corresponding one of said cold cathode fluorescent lamp and said LED unit of said lighting unit is red color light, ranges from 515 nm to 545 nm when the color light emitted by the corresponding one of said cold cathode fluorescent lamp and said LED unit of said lighting unit is green color light, and ranges from 435 nm to 465 nm when the color light emitted by the corresponding one of said cold cathode fluorescent lamp and said LED unit of said lighting unit is blue color light.

5. The illumination device as claimed in claim 1, wherein:
said dimming unit includes
first and second control buttons mounted on said lamp seat and operable so as to generate respectively first and second input signals, and a dimming circuit mounted to said lamp seat, connected electrically to said first and second control buttons and said driving unit, receiving the first and second input signals generated respectively by said first and second control buttons, and outputting to said driving unit first and second dimming control signals corresponding respectively to the first and second input signals received thereby, the first and second dimming control signals constituting the dimming output;

the light intensity of the color light emitted by said cold cathode fluorescent lamp of said lighting unit is modulated in response to the first dimming control signal; and the light intensity of the color light emitted by said LED unit of said lighting unit is modulated in response to the second dimming control signal.

6. The illumination device as claimed in claim 1, wherein:
said dimming unit includes
- a control button mounted on said lamp seat and operable so as to generate an input signal, and
- a dimming circuit mounted to said lamp seat, connected electrically to said control button and said driving unit, receiving the input signal generated by said control button, and outputting to said driving unit a dimming control signal corresponding to the input signal received thereby, the dimming control signal serving as the dimming output; and the light intensity of the color light emitted by each of said cold cathode fluorescent lamp and said LED unit of said lighting unit is modulated in response to the dimming control signal.

7. The illumination device as claimed in claim 1, wherein said lighting unit further includes a transparent tube body mounted on said lamp seat for receiving said cold cathode fluorescent lamp and said LED unit therein.

8. The illumination device as claimed in claim 1, wherein said LED unit of said lighting unit includes at least one LED.

\* \* \* \* \*